United States Patent [19]

Tanaka

[11] Patent Number: 5,289,444
[45] Date of Patent: * Feb. 22, 1994

[54] GALVANOMIRROR UNIT

[75] Inventor: Akihiro Tanaka, Tokyo, Japan

[73] Assignee: Asahi Kogaku Kogyo Kabushiki Kaisha, Tokyo, Japan

[*] Notice: The portion of the term of this patent subsequent to Sep. 28, 2010 has been disclaimed.

[21] Appl. No.: 808,690

[22] Filed: Dec. 17, 1991

[30] Foreign Application Priority Data

Dec. 17, 1990 [JP] Japan .................................. 2-406427

[51] Int. Cl.5 .............................................. G11B 7/00
[52] U.S. Cl. ............................... 369/44.14; 369/44.11; 369/119
[58] Field of Search ............... 369/44.11, 44.14, 44.22, 369/119, 112

[56] References Cited

U.S. PATENT DOCUMENTS

| 4,268,129 | 5/1981 | Araki | 369/119 |
|---|---|---|---|
| 4,466,088 | 8/1984 | Trethewey | 369/55 X |
| 4,564,757 | 1/1986 | LaBudde et al. | 369/44.14 |
| 4,761,774 | 8/1988 | Ishibashi et al. | 369/44.19 |
| 5,172,356 | 12/1992 | Kibune | 369/112 X |

FOREIGN PATENT DOCUMENTS

| 59-223954 | 12/1984 | Japan . | |
|---|---|---|---|
| 60-40029 | 3/1985 | Japan . | |
| 61-137234 | 6/1986 | Japan . | |
| 62-143236 | 6/1987 | Japan . | |
| 63-160024 | 7/1988 | Japan . | |
| 63-311225 | 12/1988 | Japan . | |
| 4-087031 | 3/1992 | Japan | 369/244 |

OTHER PUBLICATIONS

English Abstract to Japanese Patent No. 61-137234.
English Abstract to Japanese Patent No. 62-143236.
English Abstract to Japanese Patent No. 63-160024.
English Abstract to Japanese Patent No. 63-311225.
English Abstract to Japanese Patent No. 60-40029.

Primary Examiner—Aristotelis Psitos
Assistant Examiner—Duncan Wilkinson
Attorney, Agent, or Firm—Sandler, Greenblum & Bernstein

[57] ABSTRACT

A galvanomirror unit including a housing, a yoke supporting a galvanomirror to adjust the angular position thereof, and a retainer secured to the housing. The galvanomirror unit further includes an initial position adjusting mechanism provided between the yoke and the retainer to support the yoke, so as to adjust the angular position thereof in the vertical and horizontal directions, with respect to the retainer.

34 Claims, 5 Drawing Sheets

GALVANOMIRROR UNIT

BACKGROUND OF THE INVENTION

1. Field of the Invention

The present invention relates to an optical disc apparatus, such as an optical information recording and reproducing apparatus or optical information reproducing apparatus for recording information on an optical disc, such as a photo magnetic disc, and/or reproducing the recorded information. More precisely, the present invention relates to a galvanomirror unit incorporated in an optical system thereof.

2. Description of Related Art

In a known optical apparatus, an objective lens which converges a laser light beam from the laser source onto an optical disc and/or receives the light reflected from an optical disc, is linearly moved across the tracks of the optical disc in the radial direction. A known optical disc apparatus usually includes a galvanomirror unit for adjusting the laser beam emitted from the laser source within a vertical plane lying in the radial direction of the optical disc, parallel with the direction of movement of the objective lens. The galvanomirror unit has a galvanomirror which is rotated to vary the direction of the laser beam reflection with respect to the objective lens.

However, the conventional galvanomirror unit is incorporated in the optical system in a fixed manner, and accordingly, there is a possibility that the angular position of the galvanomirror reflecting surface might be improperly oriented, for example during assembly. To compensate for an improper initial angular position of the reflecting surface, it is necessary to provide an optical axis adjusting mirror separate from the galvanomirror unit.

However, the presence of an optical axis adjusting mirror, separate from the galvanomirror unit, increases the number of optical elements and results in a complicated optical arrangement.

SUMMARY OF THE INVENTION

The primary object of the present invention is to provide a simple and inexpensive galvanomirror unit having a minimum number of optical elements.

To achieve the object mentioned above, according to an aspect of the present invention, a galvanomirror unit comprising a housing, a yoke supporting a galvanomirror to adjust the angular position thereof, and a retainer secured to the housing, are provided. An initial position adjusting mechanism is provided between the yoke and the retainer to support the yoke in a manner which allows for the angular adjustment of the yoke in the vertical direction (i.e., the direction corresponding to rotation about a horizontal axis) and the horizontal i.e., the direction (direction corresponding to rotation about a vertical axis) with respect to the retainer.

According to another aspect of the present invention, an optical disc apparatus comprising a laser source for emitting a laser beam, a galvanomirror unit which includes a housing, and a yoke which supports a galvanomirror in a manner which allows for the adjustment of the galvanomirror angular position are provided. A retainer is secured to the housing, and an initial position adjusting mechanism is provided between the yoke and the retainer to support the yoke in a manner which allows for the angular adjustment of the yoke in the vertical and horizontal directions with respect to the retainer.

According to still another aspect of the present invention, an optical disc apparatus comprises a laser source, a galvanomirror unit having a galvanomirror for reflecting the laser beam emitted from the laser source in the radial direction of an optical disc, and an image forming device for converging the laser beam reflected by the galvanomirror unit onto a predetermined track of the optical disc. The said galvanomirror unit comprises an electromagnetic driving mechanism for deflecting the angular position of the galvanomirror in accordance with a tracking error signal resulting from a deviation of the laser beam from the track of the optical disc, and an initial position adjusting mechanism for adjusting the initial position of the galvanomirror in the vertical and horizontal directions, independently of the electromagnetic driving mechanism.

According to still another aspect of the present invention, a galvanomirror unit in which the laser beam emitted from a laser source is reflected toward an objective lens which is linearly moved across the tracks of an optical disc in the radial direction is provided. The unit comprises an immovable retainer, a yoke supported on the retainer in a manner which allows for the adjustment of the yoke with respect to the retainer in the vertical and horizontal directions, and a galvanomirror supported on the yoke in a manner which allows for the angular deflection of the galvanomirror with respect to the yoke.

With the construction mentioned above, since the yoke, which supports the galvanomirror is angularly adjustable with respect to the retainer, it is not necessary to provide an additional optical axis adjusting mirror for adjusting the optical axis of the galvanomirror, e.g., in the prior art where the optical axis adjusting mirror is required, thereby reducing the number of necessary optical elements.

The present disclosure relates to subject matter contained in Japanese Utility Model Application No. 2-406427 (filed on Dec. 17, 1990) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
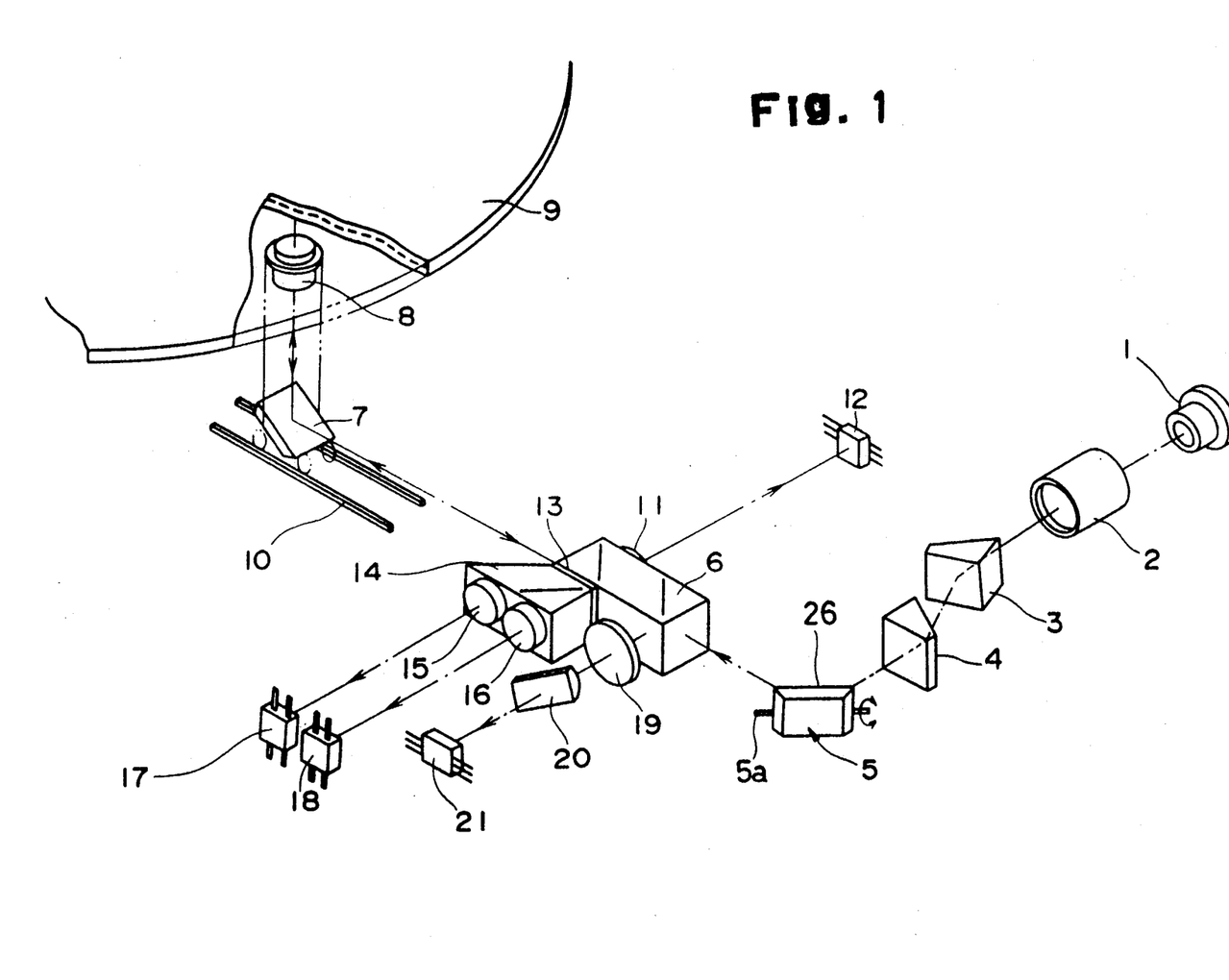
FIG. 1 is an exploded schematic perspective view of an optical disc apparatus having a galvanomirror unit according to the present invention.

FIG. 1 shows an optical disc apparatus to which the present invention is applied. In FIG. 1, the laser beam emitted from a laser source 1, such as a semiconductor laser or the like, is collimated by a collimating lens 2 and is then shaped into a circular light flux by first and second beam shaping prisms 3 and 4 as is made incident upon a galvanomirror unit 5.

Light reflected by the mirror 26 of the galvanomirror unit 5 is transmitted through a main beam splitter 6 and is then reflected by a movable mirror 7 and focused on the optical disc 9 by an objective lens 8. The movable mirror 7 and the objective lens 8 are integrally supported by a supporting member (not shown) which is linearly moved on and along guide rails 10, which extend in the radial direction of the optical disc 9, across spiral or concentric tracks of the optical disc 9.

The light reflected by the galvanomirror unit 5 is partly reflected by the main beam splitter 6 and is made incident upon an APC (Auto Power Control) sensor 12 through a condenser lens 11 for controlling the laser output.

The light reflected by the optical disc 9 is again reflected by the movable mirror 7 and then is made incident upon the main beam splitter 6 from the opposite direction. The main beam splitter 6 splits the light into light which is incident upon an auxiliary beam splitter 14 through a ½ wave plate 13, and light which is reflected by the main beam splitter 6 and is made incident upon a servo-sensor 21 through a condenser lens 19 and a cylindrical lens 20 for controlling focusing and tracking. The light incident upon an auxiliary beam splitter 14 is split, and is made incident upon an S-polarized light data sensor 17 and a P-polarized light data sensor 18 for reproducing the signals through condenser lenses 15 and 16, respectively.

If there is a tracking error, i.e., the light is not correctly focused (out of focus) on a predetermined track of the optical disc 9, the galvanomirror unit 5 rotates about the horizontal shaft 5a changing the direction of the reflecting surface of the mirror 26 within a vertical plane (pitch direction) in accordance with the tracking error signal output from the servo-sensor 21. As a result, the laser beam focal point on the optical disc 9 is slightly displaced in the radial direction (track direction) of the optical disc 9 to correct the tracking error. Thus, the tracking operation is carried out.

The following discussion will be directed to the internal construction of the galvanomirror unit 5 by way of example.

Figure 2:
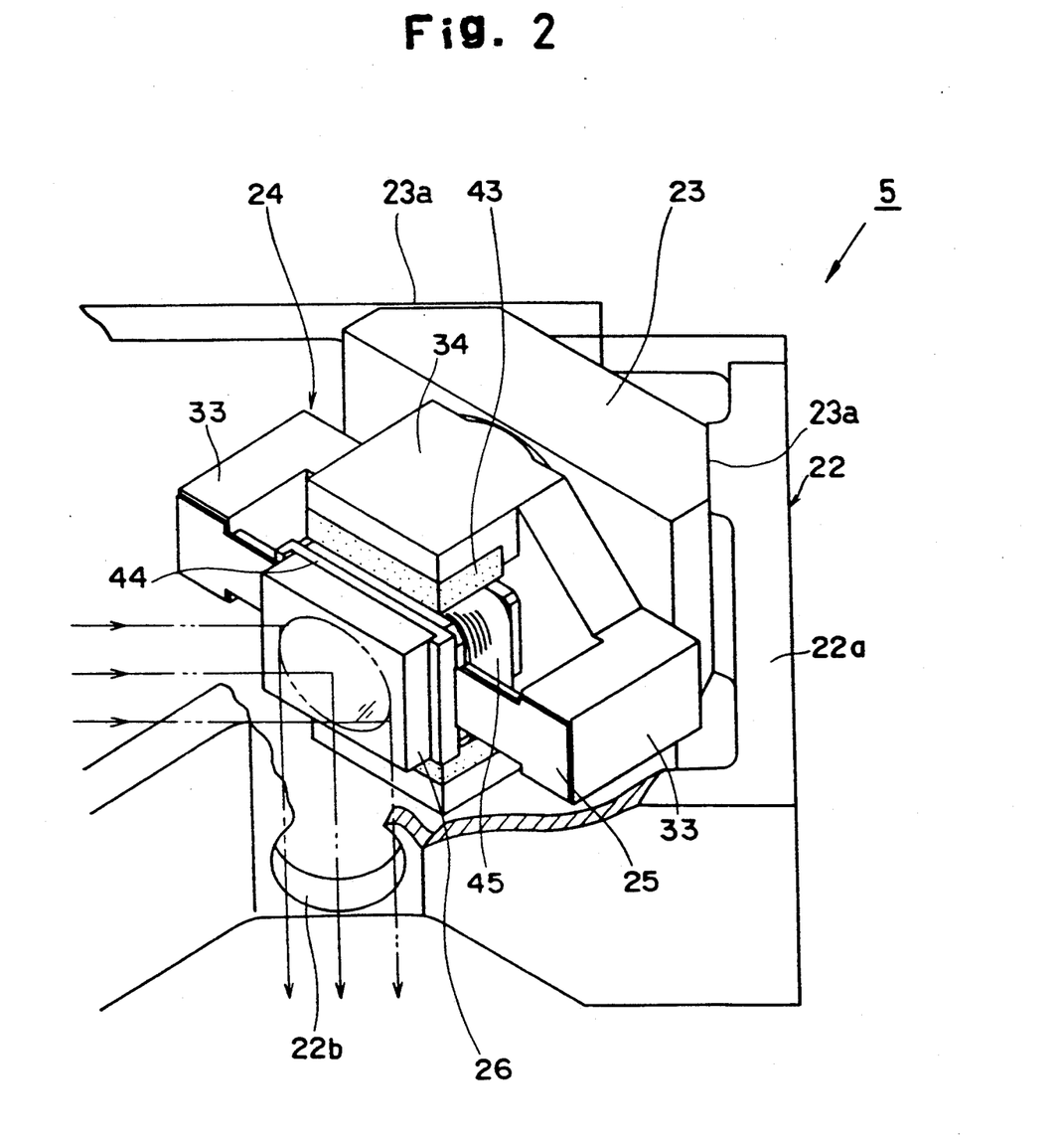
FIG. 2 is a perspective view of a galvanomirror unit according to the present invention.
Figure 3:
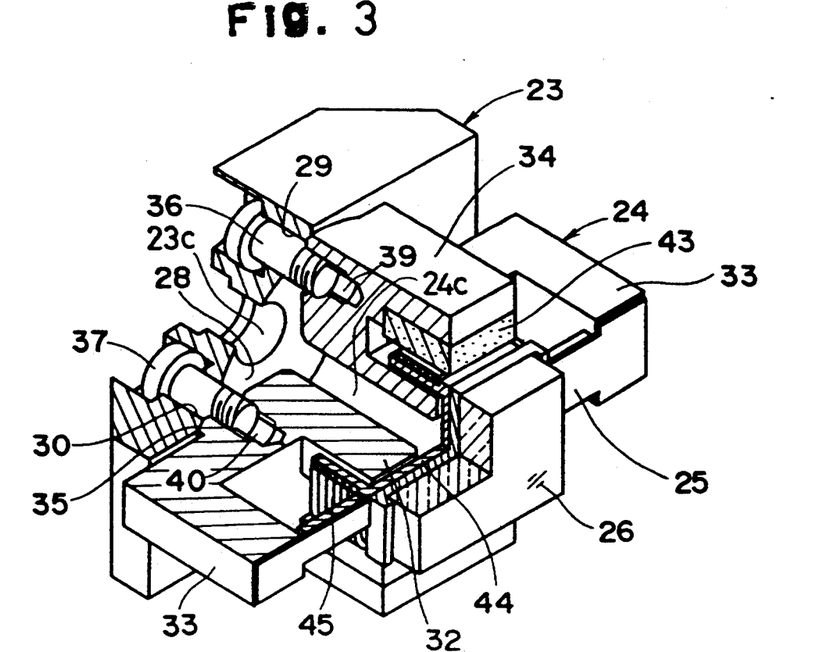
FIG. 3 is a partially cut-away perspective view of a galvanomirror unit, as shown in FIG. 2.
Figure 4:
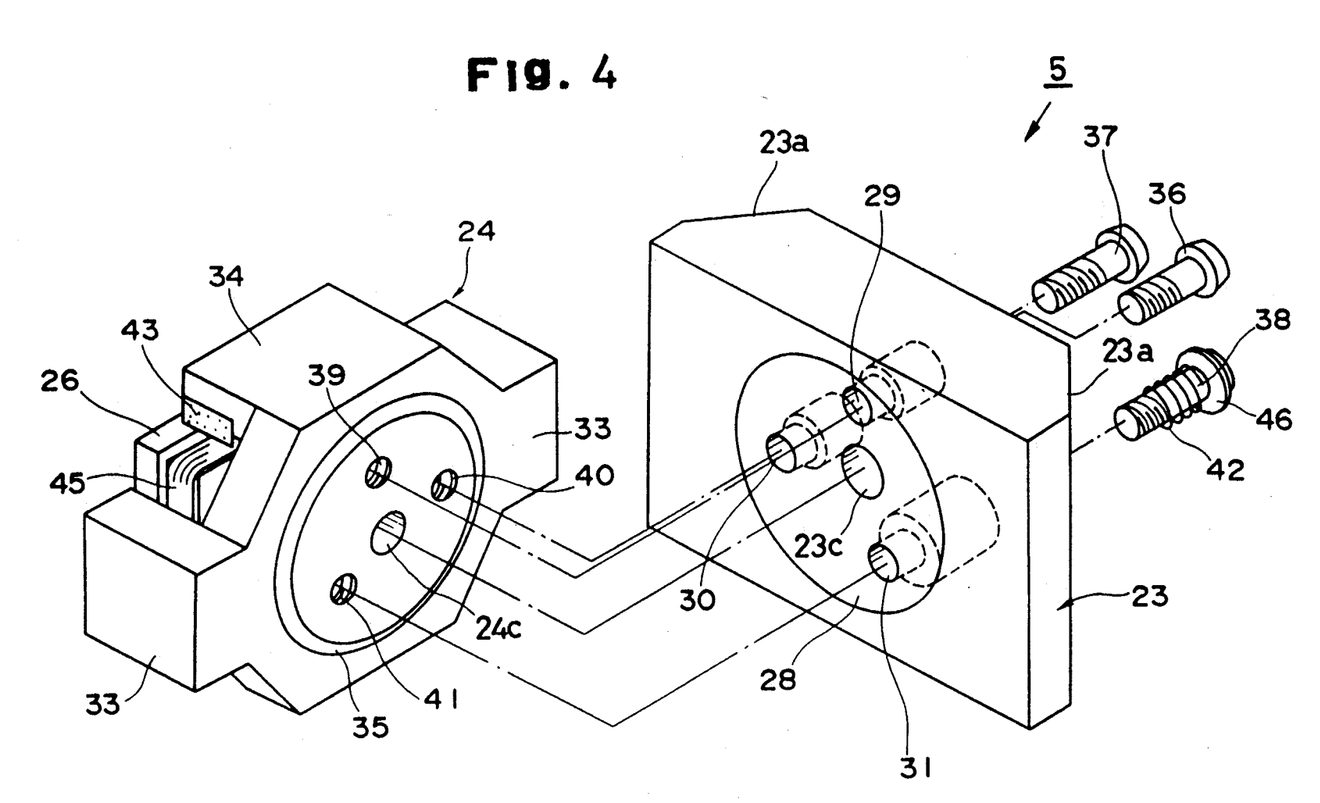
FIG. 4 is an exploded perspective view of a galvanomirror unit, as shown in FIG. 2.

A housing 22 of the galvanomirror unit 5 has a substantially square bottom plate 22c and vertical side walls 22a. A retainer 23 is provided on one corner of the housing 22, and a yoke 24 is mounted to the retainer 23. The mirror 26 (reflecting surface) is supported by a plate-like torsion spring 25 which is supported at opposite ends thereof by the yoke 24.

The retainer 23, which is located at one corner of the housing 22 at an angle of 45°, as mentioned above, has a pair of orthogonal side surfaces 23a which are inclined at an angle of 45° with respect to the mirror 26 and which are in contact with the associated vertical side walls 22a. The retainer 23 is secured to the housing 22 by a set screw 27 extending through the bottom plate 22c and the associated vertical side wall 22a. The retainer 23 is provided on its front face with a conical section recess 28 which has three holes 29, 30, and 31 extending therethrough.

The yoke 24 has a central projection 32, right and left projections 33, and upper and lower projections 34 on opposite sides of the central projection 32 in the horizontal and vertical directions, so that the yoke is generally E-shaped in both the horizontal and vertical cross-sections. The yoke 24 is provided on its rear surface with a spherical zone projection 35 defined by a spherical segment less a smaller spherical segment cut by an adjacent parallel plane. The spherical zone projection 35 can be fitted in the conical section recess 28 of the retainer. The spherical zone projection 35 is part of an imaginary sphere 35' (FIG. 5), the center of which lies in the plane of the reflecting surface of mirror 26. The spherical zone projection 35 is in movable contact with the inner surface of the conical section recess 28 of the retainer 23. Three adjusting screws 36, 37 and 38 are screwed in the yoke 24 through the holes 29, 30 and 31 formed in the retainer 23 from behind, so that the yoke 24 is integrally supported by the retainer 23 thereby making an initial adjustment of the angular position of the yoke 24 in the vertical and horizontal directions possible.

Figure 5:
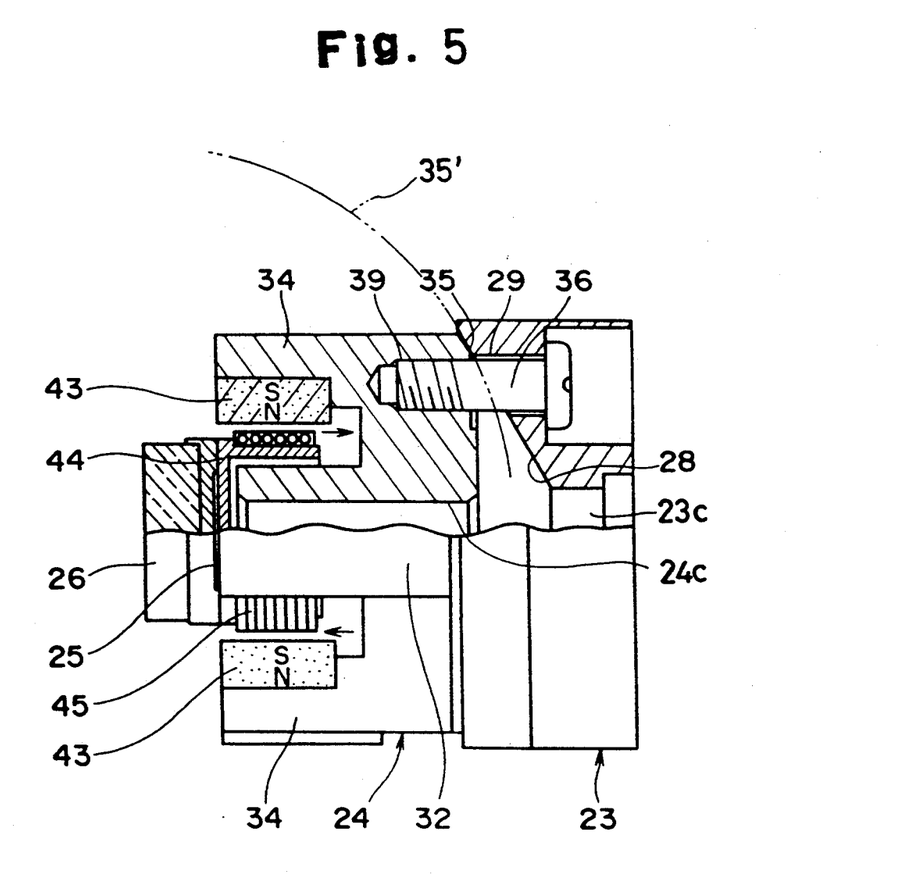
FIG. 5 is a longitudinal sectional view of a galvanomirror unit, as shown in FIG. 2; and, FIG. 6 is a partially sectioned plan view of a galvanomirror unit attached to a casing, as shown in FIG. 2.
Figure 6:
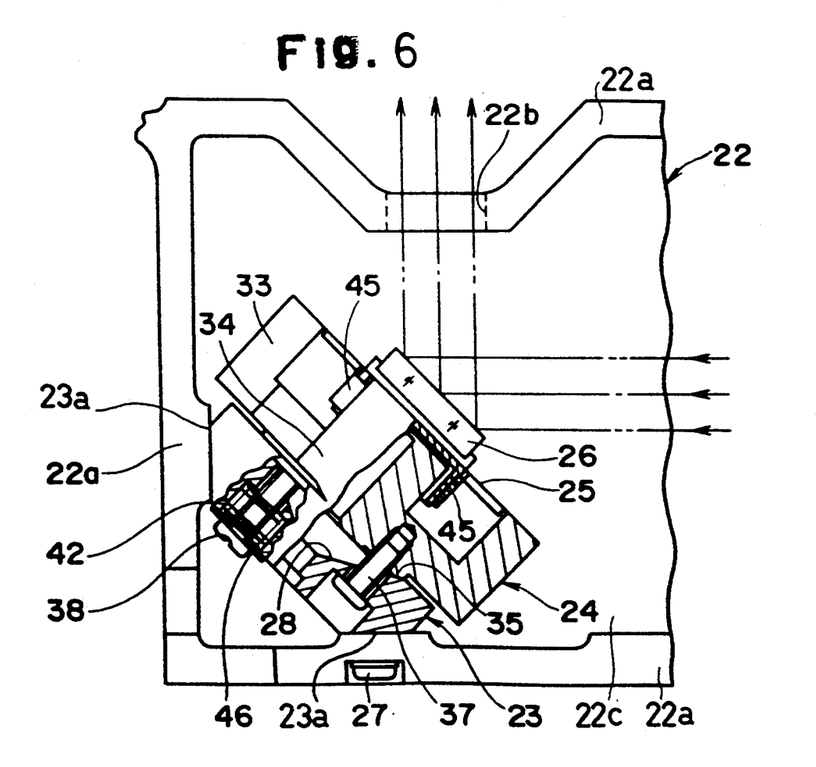

Namely, the first hole 29 is located directly above the center axes 23c and 24c, connecting the centers of the retainer 23 and the yoke 24 in the vertical direction. The second hole 30 is located in the same horizontal plane as the center axes 23c and 24c. The third hole 31 is located at a corner of an isosceles triangle of which the two remaining corners lie on the axes of the first and second holes 29 and 30. The vertical adjustment screw 36 is inserted through the first hole 29 and screwed into a threaded hole 39 formed in the rear surface of the yoke 24. The horizontal adjustment screw 37 is inserted into the second through hole 30 and screwed into a threaded hole 40 formed in the rear surface of the yoke 24, to secure the yoke 24 to the retainer 23. The final adjustment screw 38 is inserted through the third hole 31 and screwed into a threaded hole 41 formed in the rear surface of the yoke 24 through a washer 46. A compression spring 42 is provided between the washer 46 and the seat of the retainer 23 to bias the yoke 24 against the retainer 23 through the final adjustment screw 38 upon adjustment. The yoke 24 and the retainer 23 are forcibly engaged by the bias of the compression spring 42 with a pressure which is dependent upon the depth that the adjusting screws 36 and 37 are threadedly engaged. Upon completion of the horizontal and vertical adjustments, the final adjustment screw 38 is screwed inwardly to further compress the compression spring 42, thereby forcing the washer 46 against the retainer 23, so that the retainer 23 and the yoke 24 are firmly held together by the final adjustment screw 38.

The three adjusting screws, i.e., the vertical adjustment screw 36, the horizontal adjustment screw 37 and the final adjustment screw 38 are provided within the spherical zone projection 35.

The yoke 24 is provided with permanent magnets 43 on the inwardly facing surfaces of the upper and lower projections 34 which are spaced in the vertical direction. The torsion spring 25, which is in the form of an elongated leaf spring and which is provided on the front surface of the yoke 24, extends in the horizontal direction and is connected at the opposite ends thereof to the right and left projections 33. On the intermediate portion of the front surface of the torsion spring 25, the mirror 26 is provided. The surface of the mirror 26 lies in a plane which cuts the imaginary sphere 35' of the spherical zone projection 35 into two hemispheres. At the intermediate portion of the rear surface of the torsion spring 25, a frame (bobbin) 44 is mounted thereto so that it surrounds the central projection 32. A coil 45 is wound around the frame 44. The coil 45 works in conjunction with the permanent magnets 43 on the projections 34 of the yoke 24 to constitute a voice coil connected to a servo circuit which is Connected to the servo-sensor 21, shown in FIG. 1.

The housing 22 is provided with a window 22b through which the laser beam passes, so that the light reflected by the mirror 26 is emitted toward the beam splitter 6 through the window 22b.

As can be seen from the foregoing, according to the present invention, if a tracking error signal is output from the servo-sensor 21, in accordance with the light reflected from the optical disc 9, the electric current corresponding to the tracking error signal is supplied to the coil 45 of the galvanomirror unit 5. As a result of the operation of the voice coil, defined by the coil 45 and the permanent magnets 43, the upper and lower portions of the frame 44 are alternately moved backwards and forwards and at different angular displacements depending on the direction and of the electric current supplied to the coil 45, respectively, so that a torsional deformation of the torsion spring 25 takes place. Namely, the torsion spring 25 rotates about a horizontal axis 5a which lies within the incident plane of the laser. Thus, the angular displacement of the mirror 26 mounted to the torsion spring 25 is controlled to adjust the tracking deviation.

If the horizontal adjustment screw 37 is rotated in the second hole 30, the amount of thread-engagement of the horizontal adjustment screw 37 varies with respect to the yoke 24 so that the yoke 24 is slightly rotated in the horizontal direction while maintaining contact between the spherical zone projection 35 and the inner surface of the corresponding conical section recess 28. Consequently, a slight rotation of the galvanomirror 26 takes place in the horizontal direction.

In addition to the adjustment of horizontal adjustment screw 37, the vertical adjustment screw 36 is operated in substantially the same manner. Specifically, the vertical adjustment screw 36 is rotated in the first hole 29, the amount of thread-engagement of the vertical adjustment screw 36 varies with respect to the yoke 24, so that the yoke 24 is slightly rotated in the vertical direction, while maintaining contact between the spherical zone projection 35 and the inner surface of the corresponding conical section recess 28. Consequently, a slight rotation of the galvanomirror 26 takes place in the vertical direction. Thus, the adjustment of the initial position of the reflecting surface 26 of the galvanomirror unit 5 can be precisely effected.

Upon completion of the initial adjustment of the galvanomirror 26, the final adjustment screw 38, in the third hole 31, is fastened. Consequently, the final adjustment screw 38 firmly connects the retainer 23 and the yoke 24 through the washer 46. During this operation, due to the elastic force of the compression spring 42, no displacement of the yoke 24, in the vertical and horizontal directions, occurs.

As can be understood from the above discussion, according to the present invention, since the angular position of the galvanomirror 26 can be effected in both the vertical and horizontal directions by only two of the three adjusting screws, i.e. screws 36 and 37, the initial position adjustment of the galvanomirror can be easily and quickly carried out.

Furthermore, since the galvanomirror 26 is angularly adjusted in the vertical and horizontal directions while maintaining contact between the spherical zone projection of the yoke 24 and the inner surface of the conical section recess 28 of the retainer 23, the angular adjustment of the galvanomirror changes the direction of the laser beam without causing a deviation in the optical axis.

The recess 28 provided on the retainer 23 is not limited to the shape of a conical section and can be of any shape which allows for the adjustment of the spherical zone projection 35.

I claim:

1. A galvanomirror unit comprising:
   a housing;
   a yoke supporting a galvanomirror which allows for the adjustment of said galvanomirror with respect to said yoke;
   a retainer secured to said housing; and
   an initial position adjusting mechanism provided between said yoke and said retainer to support said yoke and enabling adjustment of said yoke with respect to said retainer about horizontal and vertical axes.

2. A galvanomirror unit according to claim 1, wherein said retainer has a pair of mutually orthogonal surfaces obliquely oriented with respect to said galvanomirror, and said housing has a pair of wall surfaces against which said orthogonal surfaces of said retainer abut.

3. A galvanomirror unit according to claim 2, wherein said initial position adjusting mechanism comprises:
   an abutting portion provided on a surface of said yoke opposite said galvanomirror, said abutting portion being in a shape of a spheric zone projection, wherein a center of an imaginary sphere, of which said spheric zone is a part, lies in a plane of said galvanomirror;
   a recess provided on said retainer to come into circularly rotatable contact with said abutting portion; and
   a fastening device for securing said yoke to said retainer.

4. A galvanomirror unit according to claim 3, wherein said fastening device comprises:
   three adjusting screws which are engage said yoke through said retainer.

5. A galvanomirror unit according to claim 4, wherein:
   said three adjusting screws are located at corners of an isosceles triangle.

6. A galvanomirror unit according to claim 5, wherein two of said three adjusting screws are positioned above and beside a center of said abutting portion to form a right angle with said center of said abutting portion, a corner of said right angle being located at said center of said abutting portion.

7. A galvanomirror unit according to claim 6, wherein a remaining adjusting screw is provided thereon with a compression spring to bring said yoke and said retainer into contact with each other.

8. A galvanomirror unit according to claim 7, wherein said three adjusting screws are located inside a circular portion of said recess which is in contact with said abutting portion of said yoke.

9. A galvanomirror unit according to claim 1, further comprising:
   a torsion spring to which said galvanomirror is secured, said torsion spring being secured to said yoke.

10. A galvanomirror unit according to claim 9, further comprising:

an electromagnetic rotating mechanism provided between said torsion spring and said yoke to adjust a direction of said galvanomirror.

11. An optical disc apparatus comprising:
a laser source for emitting a laser beam;
a galvanomirror unit which includes a housing;
a yoke which supports a galvanomirror allowing for angular adjustment of said galvanomirror with respect to said yoke;
a retainer secured to said housing; and
an initial position adjusting mechanism provided between said yoke and said retainer to support said yoke and enabling angular adjustment of said yoke with respect to said retainer about horizontal and vertical axes.

12. An optical disc apparatus according to claim 11, wherein said galvanomirror reflects said laser beam emitted from said laser source to make said laser beam incident upon said optical disc.

13. An optical disc apparatus according to claim 12, further comprising:
an objective lens which converges said laser beam onto a predetermined track of said optical; disc after said laser beam is reflected by said galvanomirror in a radial direction of said optical disc.

14. An optical disc apparatus according to claim 13, further comprising:
a reflecting mirror for reflecting said laser beam reflected by said galvanomirror toward said objective lens.

15. An optical disc apparatus according to claim 14, wherein said reflecting mirror and said objective lens are together movable in the radial direction of said optical disc.

16. An optical disc apparatus comprising:
a laser source;
a galvanomirror unit having a galvanomirror for reflecting a laser beam from said laser source in a radial direction of an optical disc; and,
an image forming device for converging said laser beam reflected by said galvanomirror unit onto a predetermined track of said optical disc;
said galvanomirror unit comprising an electromagnetic driving mechanism for deflecting an angular position of said galvanomirror in accordance with a tracking error signal corresponding to a deviation of said laser beam from a track of said optical disc; and
an initial position adjusting mechanism for adjusting an initial position of said galvanomirror about vertical and horizontal axes, independently of said electromagnetic driving mechanism.

17. An optical disc apparatus according to claim 16, wherein said galvanomirror unit comprises:
a housing; a torsion spring to which said galvanomirror is secured;
a yoke which supports a galvanomirror allowing for angular adjustment of said galvanomirror;
a retainer secured to said housing; and
said initial position adjusting mechanism provided between said yoke and said retainer to support said yoke allowing for angular adjustment of said yoke in vertical and horizontal directions with respect to the retainer.

18. An optical disc apparatus according to claim 17, wherein said retainer comprises:
a pair of orthogonal surfaces obliquely oriented with respect to said galvanomirror;
said housing having a pair of wall surfaces against which said orthogonal surfaces of said retainer abut.

19. A galvanomirror unit according to claim 18, wherein said initial position adjusting mechanism comprises:
an abutting portion provided on a surface of said yoke opposite said galvanomirror, said abutting portion having the shape of a spheric zone section, wherein a center of an imaginary sphere, of which said spheric zone is a part, lies in a plane of said galvanomirror;
a recess provided on said retainer to come into circular rotatable contact with said abutting portion; and
a fastening device for securing said yoke to said retainer.

20. A galvanomirror unit according to claim 19, wherein said fastening device comprises:
three adjusting screws which engage said yoke through said retainer.

21. A galvanomirror unit according to claim 20, wherein:
said three adjusting screws are located at the corners of an isosceles triangle.

22. A galvanomirror unit according to claim 21, wherein two of said three adjusting screws are positioned above and, beside a center of said abutting portion to form a right angle with said center of said abutting portion, a corner of said right angle being located at said center of said abutting portion.

23. A galvanomirror unit according to claim 22, wherein a remaining adjusting screw is provided therein with a compression spring to bring said yoke and said retainer into contact with each other.

24. A galvanomirror unit according to claim 23, wherein said three adjusting screws are located inside a circular portion of said recess contacting said abutting portion of said yoke.

25. A galvanomirror unit in which a laser beam form a laser source is reflected towards an objective lens which is linearly moved across tracks of an optical disc in a radial direction, wherein said galvanomirror unit comprises:
an immovable retainer;
a yoke supported on said retainer allowing for angular adjustment of said yoke about vertical and horizontal axes; and
a galvanomirror supported on said yoke in a manner which allows for angular deflection of said galvanomirror with respect to said yoke.

26. A galvanomirror unit according to claim 25, wherein said yoke is provided on its back surface with a spherical zone projection abutting portion and wherein said retainer is provided with a recess which comes into contact with said abutting portion of said yoke, said yoke and said retainer being secured to each other by three adjusting screws located on the corners of an isosceles triangle.

27. A galvanomirror unit according to claim 1, said initial position adjusting mechanism comprising means for enabling vertical and horizontal adjustment of said yoke with respect to said retainer about a center of said galvanomirror.

28. The galvanomirror unit according to claim 1, said initial position adjusting mechanism comprising adjustable contacting surfaces on each of said yoke and said retainer.

29. The galvanomirror unit according to claim 1, said initial position adjusting mechanism comprising means for enabling rotation of said galvaniomirror about horizontal and vertical axes such that a center of said galvanomirror is maintained at an original position during adjustment about horizontal and vertical axes.

30. The galvanomirror unit according to claim 1, said initial position adjusting mechanism comprising a conical section recess on said retainer and a spherical zone projection on said yoke, said spherical zone projection adjustably contactable with said conical section recess, said spherical zone projection being defined as a portion of an imaginary sphere with a center in the plane of said galvanomirror.

31. The galvanomirror unit according to claim 1, said retainer and said yoke defining adjustably contactable surfaces, said adjustably contactable surfaces comprising means for enabling rotation of said galvanomirror about horizontal and vertical axes of said galvanomirror with a center of said galvanomirror remaining at an original position.

32. The optical disc apparatus according to claim 11, said initial position adjusting mechanism comprising adjustably contactable surfaces on said yoke and on said retainer said adjustably contactable surfaces comprising means for enabling angular adjustment of said yoke with respect to said retainer about horizontal and vertical axes, with a center of said galvanomirror remaining at an original position.

33. The optical disc apparatus according to claim 16, said initial position adjusting mechanism comprising adjustably, contactable surfaces on said yoke and on said retainer, said adjustably contactable surfaces comprising means for enabling angular adjustment of said yoke with respect to said retainer about horizontal and vertical axes.

34. The galvanomirror unit according to claim 25, said retainer and yoke defining adjustably contactable surfaces, said surfaces comprising means for enabling adjustment of said yoke with respect to said immoveable retainer about vertical and horizontal axes.

* * * * *

UNITED STATES PATENT AND TRADEMARK OFFICE
CERTIFICATE OF CORRECTION

PATENT NO. : 5,289,444
DATED : February 22, 1994
INVENTOR(S) : Akihiro TANAKA

It is certified that error appears in the above-indentified patent and that said Letters Patent is hereby corrected as shown below:

At column 7, line 23 (claim 13, line 4) of the printed patent, change "optical;" to ---optical---.

At column 8, line 27 (claim 22, line 3) of the printed patent, change "and," to ---and---.

At column 8, line 33 (claim 23, line 3) of the printed patent, change "therein" to ---thereon---.

At column 8, line 58 (claim 26, line 7) of the printed patent, change "the corners" to ---corners---.

At column 8, line 60 (claim 27, line 1) of the printed patent, change "A" to ---The---.

Signed and Sealed this

Fifth Day of September, 1995

Attest:

BRUCE LEHMAN

Attesting Officer

Commissioner of Patents and Trademarks